United States Patent [19]

Nemoto

[11] Patent Number: 5,003,806

[45] Date of Patent: Apr. 2, 1991

[54] APPARATUS FOR PRODUCING CURVILINEAR TUBES

[76] Inventor: Isao Nemoto, 11-24, Higashinarashino 6-chome, Narashino-shi, Chiba-ken, Japan

[21] Appl. No.: 425,120

[22] Filed: Oct. 23, 1989

[30] Foreign Application Priority Data

May 29, 1987 [JP] Japan .............................. 62-82923[U]

[51] Int. Cl.$^5$ ............................................ B21C 25/08
[52] U.S. Cl. ........................................ 72/260; 72/263; 72/264; 425/466
[58] Field of Search ................. 72/260, 263, 264, 269; 425/466, 381, 465

[56] References Cited

U.S. PATENT DOCUMENTS

| | | | |
|---|---|---|---|
| 139,946 | 6/1873 | Cunningham | 72/260 |
| 373,743 | 11/1887 | Kent . | |
| 384,956 | 6/1888 | Boll | 72/260 |
| 3,122,830 | 3/1964 | Dawson et al. . | |
| 3,626,564 | 12/1971 | Daniel . | |
| 3,702,751 | 11/1972 | Mehnert | 72/263 |
| 3,807,916 | 4/1974 | Ramsey | 425/113 |
| 4,212,620 | 7/1980 | McLaren | 425/466 |
| 4,649,728 | 3/1987 | LaCount et al. | 72/370 |
| 4,906,171 | 3/1990 | Miller | 425/381 |

FOREIGN PATENT DOCUMENTS

| | | | |
|---|---|---|---|
| 591387 | 1/1934 | Fed. Rep. of Germany | 72/264 |
| 727974 | 11/1942 | Fed. Rep. of Germany | 72/264 |
| 1107926 | 5/1961 | Fed. Rep. of Germany | 72/260 |
| 1948580 | 4/1970 | Fed. Rep. of Germany | 425/466 |
| 2844804 | 4/1980 | Fed. Rep. of Germany . | |
| 7549 | 3/1975 | Japan . | |
| 59-93551 | 5/1984 | Japan . | |
| 123636 | 7/1984 | Japan . | |
| 557837 | 5/1977 | U.S.S.R. | 72/264 |
| 590045 | 1/1978 | U.S.S.R. | 72/370 |
| 5094 | of 1887 | United Kingdom | 72/260 |
| 20674 | of 1901 | United Kingdom | 72/260 |
| 1031061 | 5/1966 | United Kingdom | 72/263 |

OTHER PUBLICATIONS

Rubber Chemistry and Technology, vol. 54, 1981, May-Jun., No. 2, Akron, U.S.; L. A. Goettler et al., pp. 77-300, FIGS. 4, 9-11.

*Primary Examiner*—Daniel C. Crane
*Attorney, Agent, or Firm*—Nixon & Vanderhye

[57] ABSTRACT

The present invention relates to an apparatus for producing three-dimensional curvilinear tubes. The apparatus comprises (a) a tube producing die having an axisymmetric inner surface for passing tube material therethrough; (b) a core member having an axi-symmetrical outer surface and disposed in the die in a spaced relation to the inner surface of the die so that the tube producing material passes between a gap defined by the inner surface of the die and the outer surface of the core member; and (c) positioning devices for positioning the die in offset relation to the core member in a plane perpendicular to an axis of the die.

11 Claims, 9 Drawing Sheets

APPARATUS FOR PRODUCING CURVILINEAR TUBES

RELATED APPLICATIONS

This application is a continuation-in-part of co-pending application Ser. No. 07/199,794 filed May 26, 1988, now abandoned.

BACKGROUND OF THE INVENTION

The present invention relates to an apparatus for producing curvilinear tubes.

One conventional method for obtaining a curvilinear tube is to pass a bent fitting through a hollow space of a straight tube so as to force a plastic deformation of the tube according to the curvature of the fitting.

Another conventional method is to force a straight tube into a producing apparatus comprising a bent outer fitting and a bent inner fitting. The inner diameter of the bent outer fitting is nearly equal to the outer diameter of the tube and the outer diameter of the bent inner fitting is nearly equal to the inner diameter of the tube. Once the tube is forced into the producing apparatus, a plastic deformation according to the curvature of the producing apparatus remains on the tube. The inner fitting may be replaced by a pressurized fluid such as air and oil so that the outer surface of the tube is forced to fit with the inner surface of the outer fitting.

An apparatus for producing a curvilinear tube is provided by a Japanese patent application No. 59-123636. The apparatus comprises a tubular die and a core member, arranged so that the tubular die is aligned parallel to the core member and supported for displacement relative thereto. According to this document, when the die is coaxially disposed relative to the core member, a straight tube is formed by passing a tube therethrough. When the die is off-centered relative to the core member, a curvilinear tube is formed by passing a tube therethrough.

The above mentioned apparatus is superior to the above described fittings in that curvilinear tubes of more varied forms are obtained thereby, and in that the workability thereof is higher.

There are problems, however, related to the above mentioned apparatus in that the positioning of the second die relative to the first die is not sufficiently precise, resulting in dimensional errors in the finished products. Another inconvenience in the apparatus is that the tubes are bent only in one direction because movement of the die relative to the core member is uni-dimensional, along a line perpendicular to the axis of the core member. As far as the above mentioned conventional apparatus is concerned, it was impractical to make the second die two-dimensionally dislocatable relative to the core member because of the bulky mechanism for positioning the second die.

SUMMARY OF THE INVENTION

An object of the present invention, therefore, is to provide an apparatus for producing more precisely dimensioned curvilinear tubes.

Another object of the present invention is to provide an apparatus for producing three-dimensional curvilinear tubes.

In accordance with one exemplary embodiment of the invention, the apparatus includes a frame, a tube producing mechanism, a first positioning mechanism and a second positioning mechanism. The tube producing mechanism includes a fixing bed for fixing the position of a core member relative to the frame, and a movable bed for holding a tube producing die which is adjustable relative to the frame and a plane perpendicular to an axis of the core member. Thus, it will be appreciated that the bed is adjustable in two dimensions.

Material used to form the tube is forced through a gap formed between the core member and the tube producing die along the core member and, by adjusting the position of the tube producing die relative to the core member, the tube material may be curvilinearly formed as it passes through the gap.

Each of the positioning mechanisms comprises an electric motor, transmission mechanism, a crank and a link mechanism which cooperate to transform rotational movement of the electric motor to linear movement of the movable bed, as will be explained in greater detail hereinbelow. The operation of the first and second positioning mechanisms is preferably controlled by a unit which controls fine motion of the mechanisms so as to enable precise dimensioning of the curvilinear tube.

Accordingly, in accordance with one aspect of the present invention, there is provided an apparatus for producing curvilinear tubes, the apparatus comprising: (a) an annular, open ended die having a longitudinal center axis; (b) a core member having a longitudinal center axis disposed within the annular die; (c) positioning means for moving the annular die relative to the core member so that the respective longitudinal axis of said die and said core member are offset; wherein said annular die is mounted on a movable bed and said positioning means includes means for moving said bed in two dimensions.

Other objects and advantages of the invention will become apparent from the detailed description which follows.

DETAILED DESCRIPTION OF THE DRAWINGS

Figure 1:
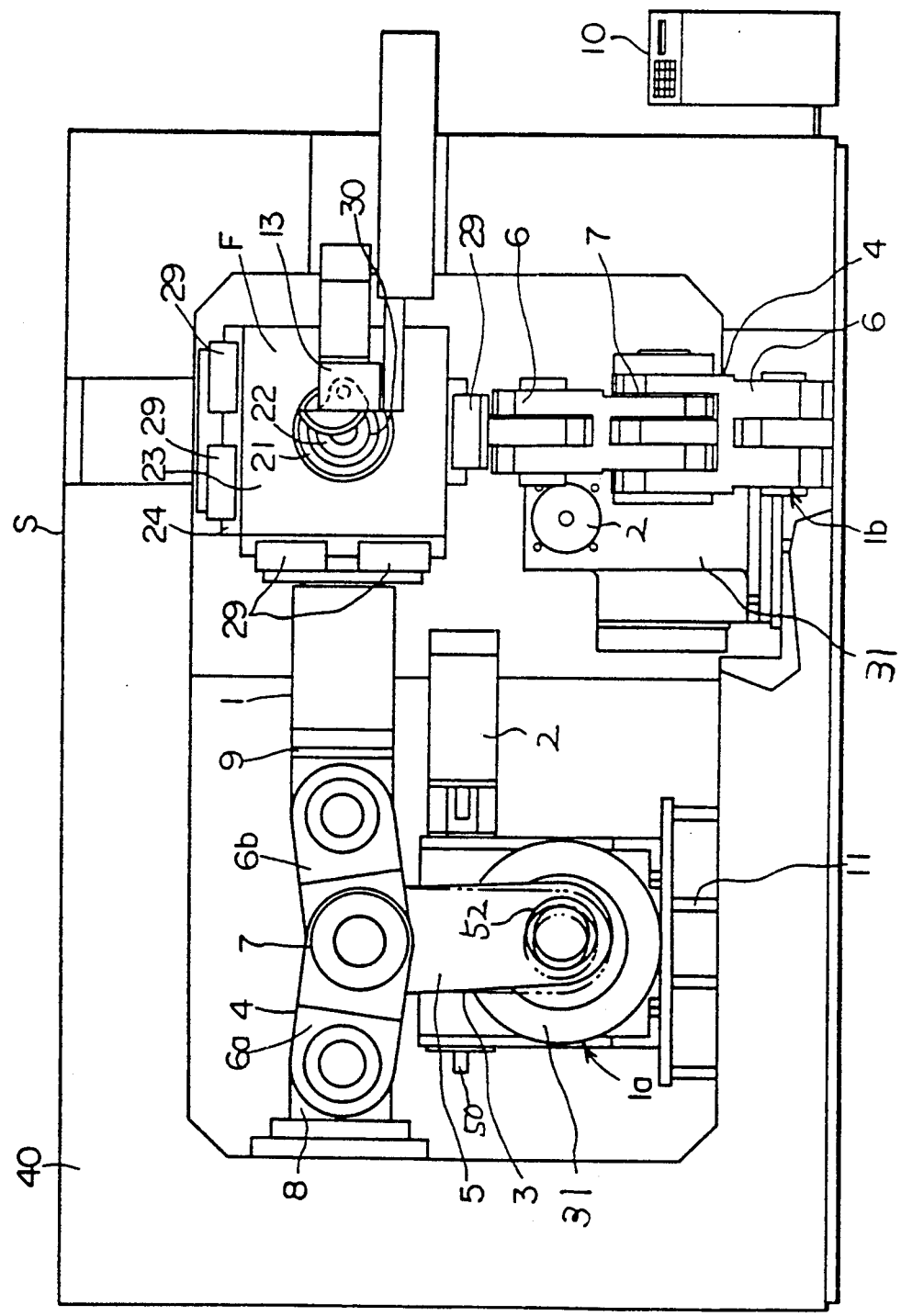
FIG. 1 shows an elevation view of an apparatus according to an embodiment of the present invention.

Preferred embodiments of the present invention will be explained hereinafter in more detail with reference to the drawings in which like reference numerals denote same members or elements.

Figure 2:
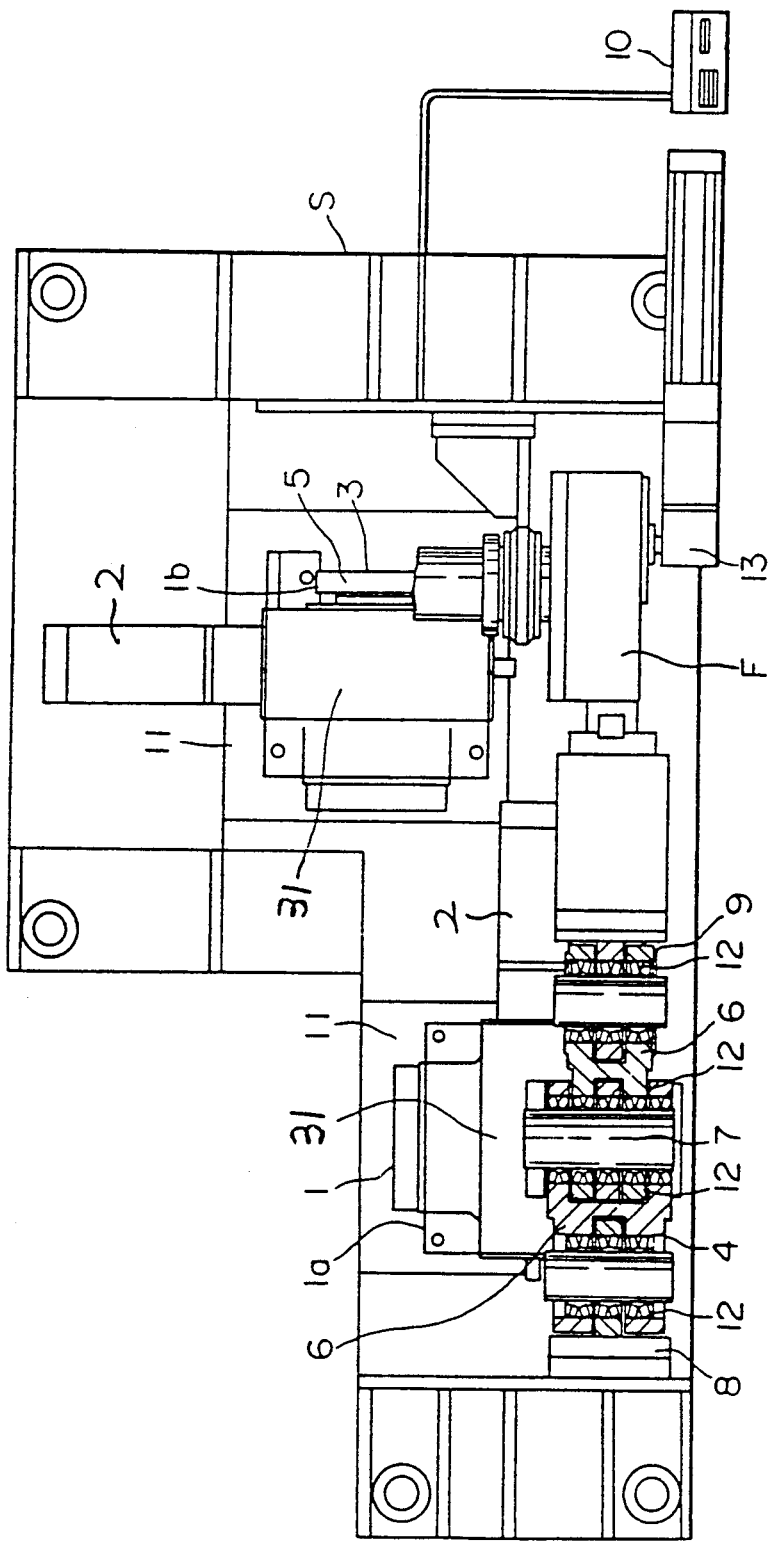
FIG. 2 shows a plan view of an apparatus according to an embodiment of which an elevation view is shown by FIG. 1.
Figure 8:
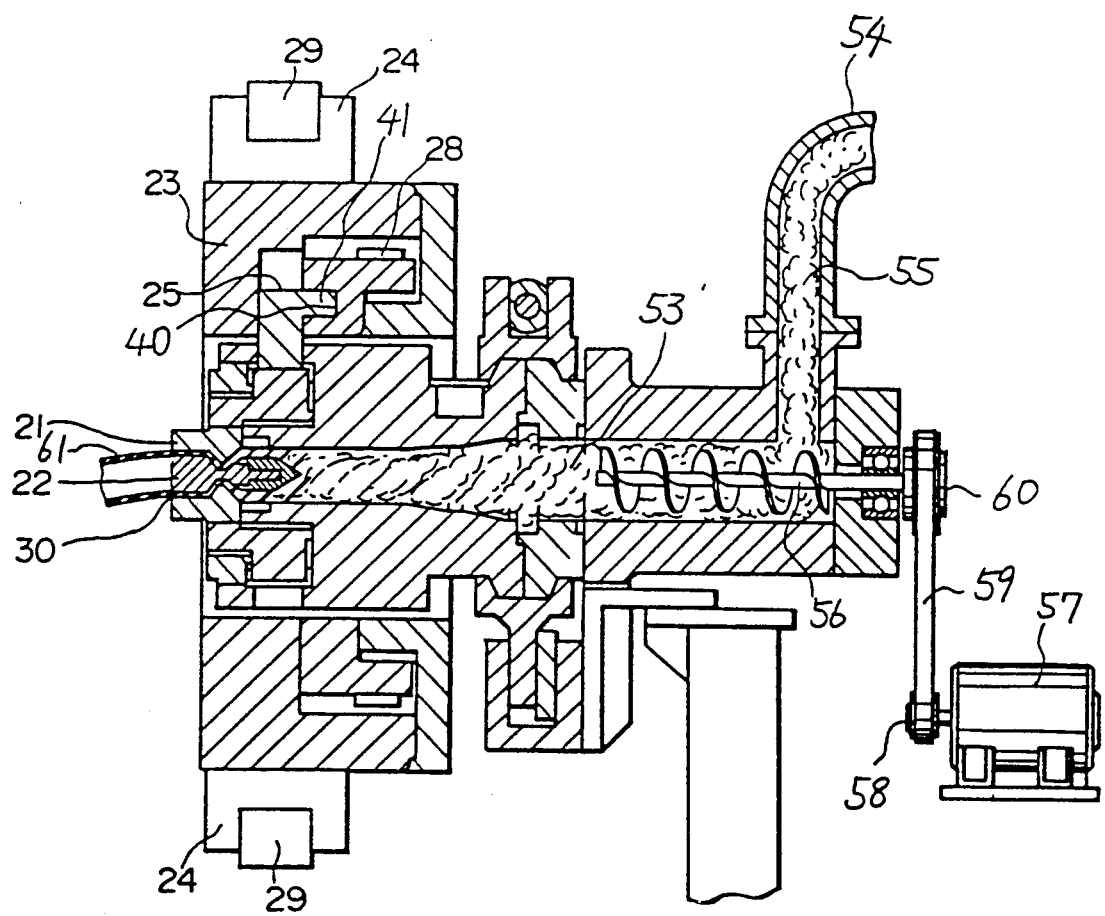
FIG. 8 is an enlarged cross-sectional side view of a tube producing mechanism in accordance with the invention.

As shown in FIGS. 1 and 2, an apparatus S for producing curvilinear tubes comprises a frame 40, a tube producing mechanism F, a first positioning mechanism 1a and a second positioning mechanism 1b. The tube producing mechanism F includes a fixing bed 24 for fixing a position of a core member 22 relative to the frame 40 and a movable bed 23 for holding an annular tube producing die 21 dislocatable relative to the frame 40 in a plane perpendicular to an axis of the core member 22. In other words, the movable bed 23 is adjustable bi-dimensionally in a plane whereon FIG. 1 is drawn. The die 21 has a through bore, the interior surface of which determines the outside diameter of the finished tube. The core member 22 determines the inside diameter of the finished tube, and the adjustment of the die 21 relative to the core member 22 determines the curvature of the tubular product. In this regard, it will be appreciated that if the core member is located concentrically within the die, i.e., so that the longitudinal center axis of each are coincident, a straight tube would be produced. However, by adjusting the die so that the respective axes are offset, a curvilinear tube is produced With reference to FIGS. 4 and 8, tube material 55 is forced to pass through a gap formed between the core member 22 and the tube producing die 21 along the core member 22, that is, in a direction perpendicular to the paper. By adjusting the position of the tube producing die 21, that is, by locating the tube producing die 21 off-center relative to the core member 22, the tube material is curvilinearly formed as it passes through the gap. The tube material is extruded from an outlet portion 30 which comprises a gap between the die 21 and the core member 22, after passing through the die 21.

The movable bed 23 is connected to the first positioning mechanism 1a which determines the displacement of the movable bed 23 in a horizontal direction, that is, from side to side in FIG. 1, by means of an electric motor 2 and a first transformation mechanism connecting the motor 2 and the movable bed 23 for transforming a rotational movement of the first positioning mechanism 1a to a horizontal linear movement of the movable bed 23. The movable bed is also connected to a second positioning mechanism 1b which determines the displacement of the movable bed 23 in a vertical direction, that is, from top to bottom in the figure, by means of a similar mechanism as the above mentioned first transformation mechanism.

Figure 6:
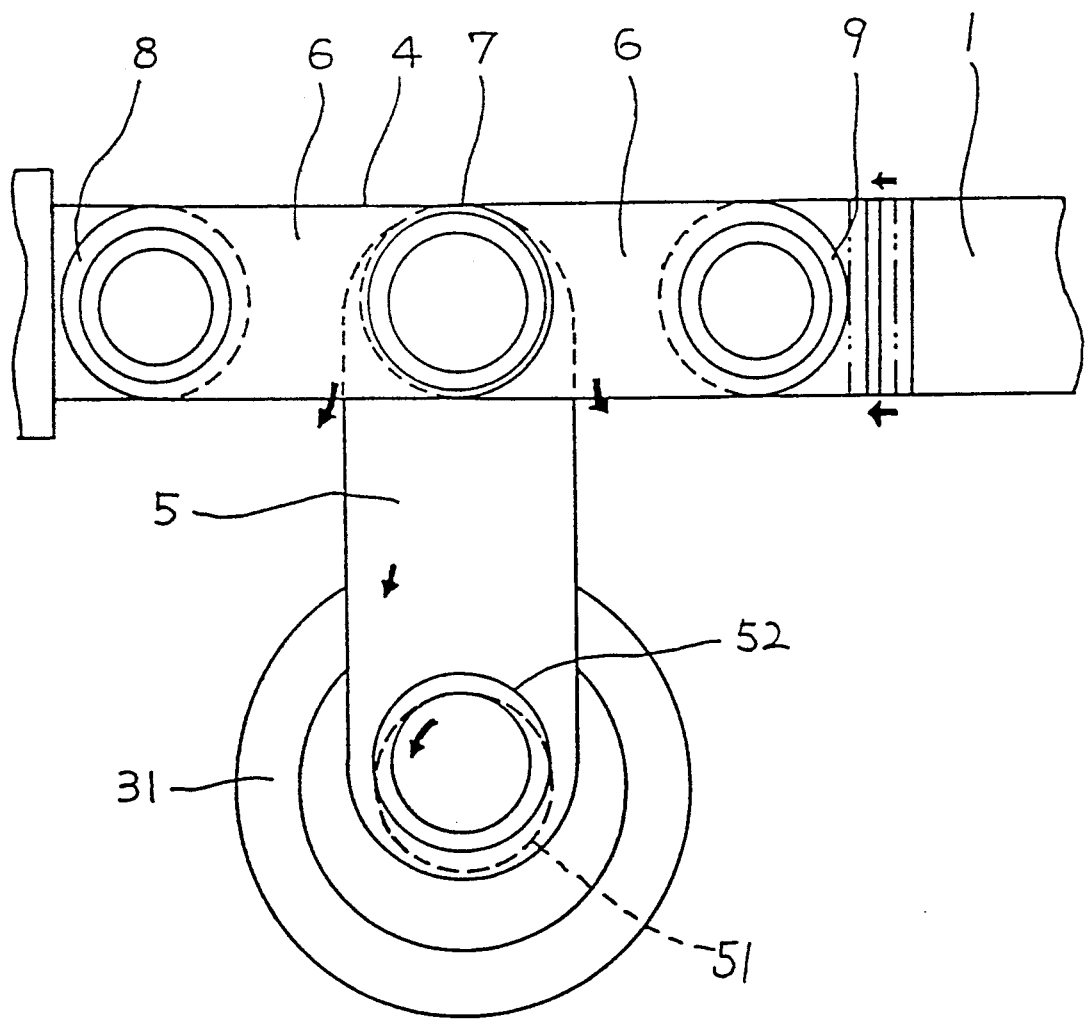
FIGS. 6 and 7 are enlarged side views of the link mechanism illustrated in FIG. 1, at different stages of operation.
Figure 7:
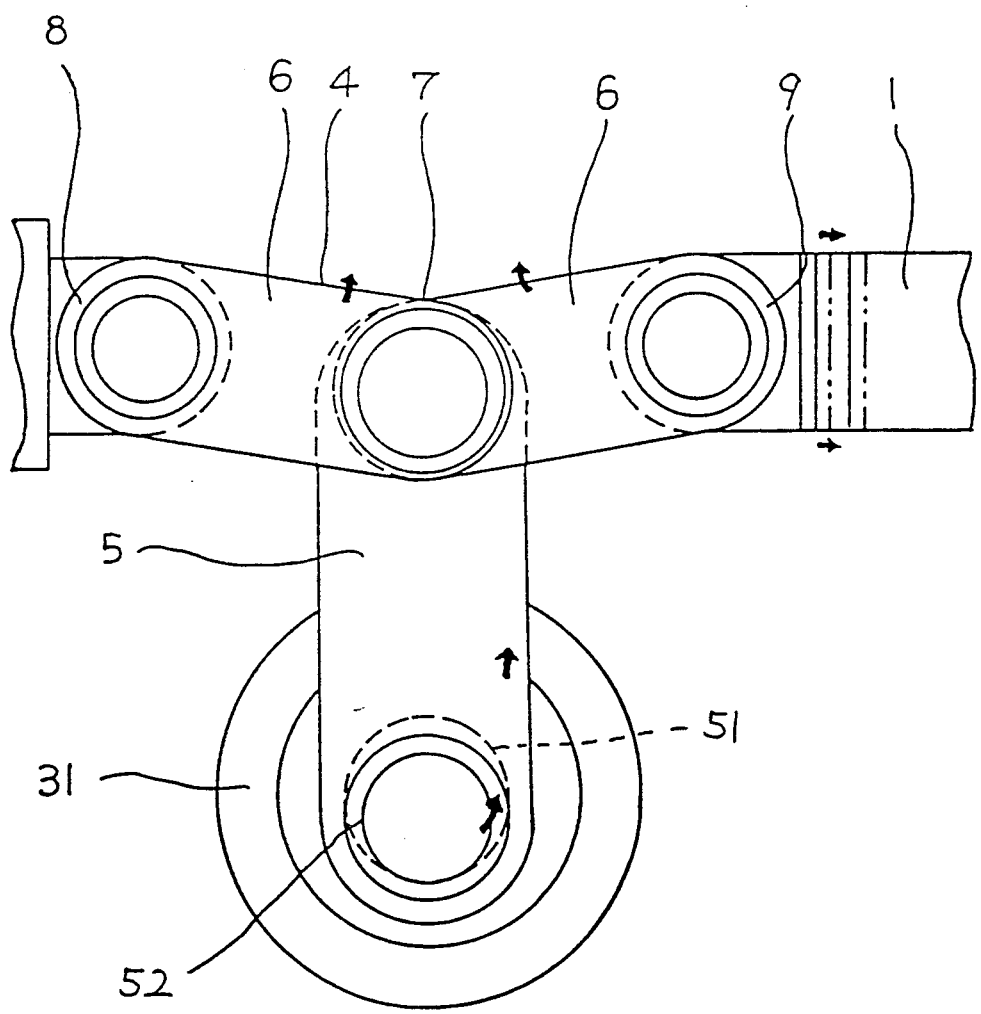

As shown in FIGS. 1 and 2, the fixing bed 24 and the first and second positioning mechanisms 1a, 1b, respectively, are secured to the frame 40. The movable bed 23 is supported from the fixing bed 24 by means of slide bearings 29 for a movement in a plane perpendicular to the axis of the core member 22 while keeping a sliding contact to the fixing bed 24. Each positioning mechanism 1a, 1b comprises an electric motor 2, a transmission mechanism 31, a crank 3 and a link mechanism 4 co-working to transform a rotational movement of the electric motor 2 to a linear movement of the movable bed 23. With additional reference to FIGS. 6 and 7, the link mechanism 4 comprises a pair of link rods 6a, 6b which are connected by a hinge 7 at one of their ends. The other end of the link rod 6a is connected to a frame 40 of the apparatus S through a hinge 8. The other end of the link rod 6b is connected to the movable bed 23 through a hinge 9 and a tie rod 1.

Figure 5:
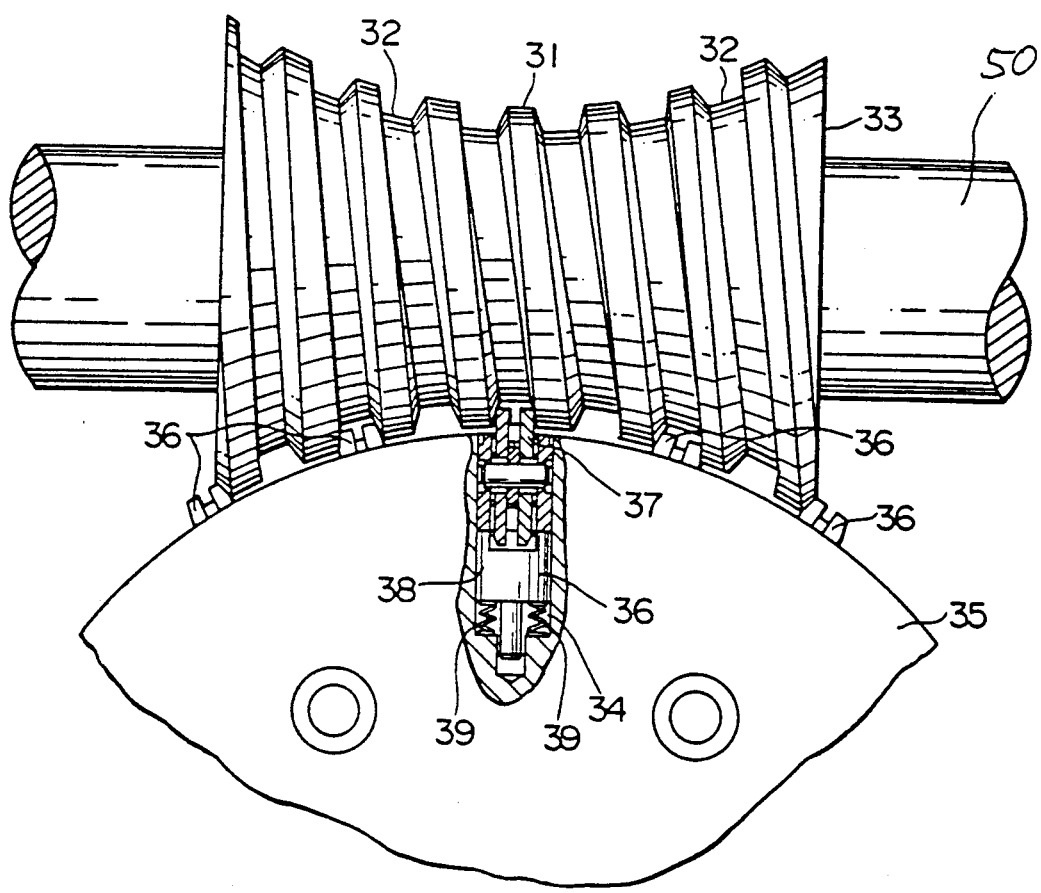
FIG. 5 is a partially cut-off view of a worm gear mechanism according to an embodiment of the present invention.

Rotation of the motor 2 is first transmitted to the transmission mechanism (speed reduction mechanism) 31 (shown in detail in FIG. 5). The shaft of the motor 2 is connected to an input shaft 50 of the transmission mechanism 31. An output shaft 51 of the transmission mechanism 31 is connected rotatably to an eccentric shaft 52 slidably attached to an end of the crank rod 5 of the crank 3. The output shaft 51 and the eccentric shaft 52 are connected eccentrically to each other. The other end of the crank rod 5 is connected to the hinge 7 at which the link rod 6a and 6b are connected, so that the crank rod 5 is arranged generally vertically. Therefore, the rotation of the output shaft 51 is changed to a rotation of a general vertical reciprocation of the crank rod 5 as represented by arrows shown in FIGS. 6 and 7. The reciprocation of the crank rod 5 is transmitted to the horizontal movement of the tie rod 1 as represented by arrows shown in FIGS. 6 and 7 because of the above structure of the link mechanism 4. The above description is in reference to the first positioning mechanism 1a for horizontal movement of the movable bed 23. However, the function and the structure of the positioning mechanism 1b for vertical movement of the movable bed 23 are similar to those of the mechanism 1a.

Operation of the first and second positioning mechanisms 1a, 1b may preferably be controlled by a control unit 10 which controls a fine motion of the mechanisms 1a, 1b so as to enable a delicate dimensioning of the curvilinear tube.

The crank 3 and the link mechanism 4 may be replaced by a ball gear mechanism for taking the same role.

Figure 3:
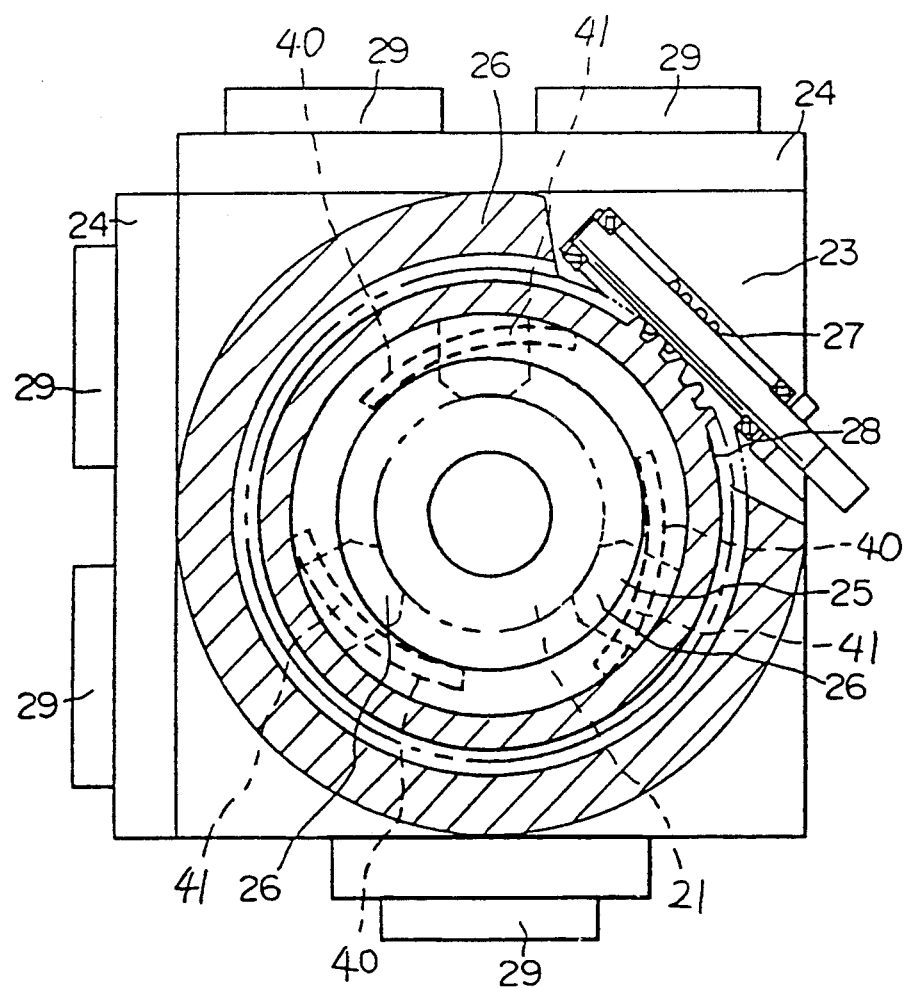
FIG. 3 shows a holder mechanism for holding a tube producing die according to an embodiment of the present invention.

As shown in FIG. 3, the movable bed 23 comprises a holding mechanism 25 having three claws 26 movable radially by means of worms 27 and worm wheels 28 meshing with each other.

Figure 4:
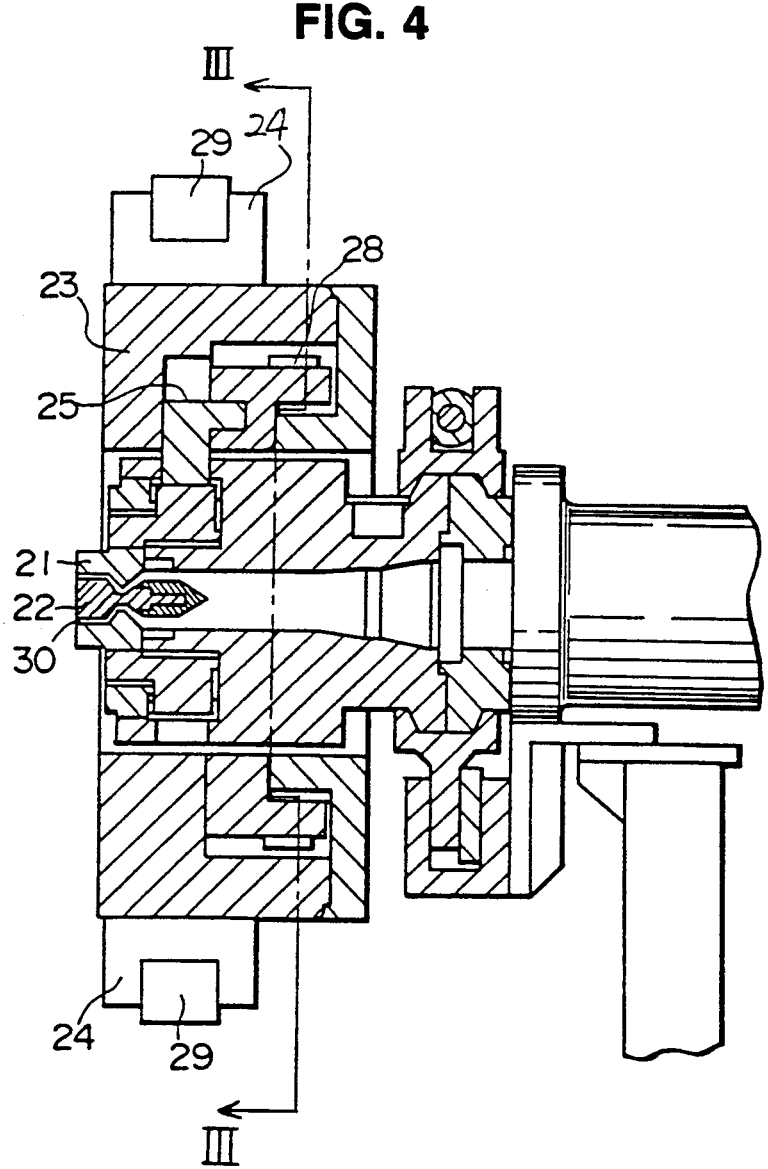
FIG. 4 is a cross-sectional view of a tube producing die and a core member together with surrounding mechanisms.

FIG. 4 shows a partially cut-off view of the tube producing mechanism 4. The tube producing die 21 is held by the holding mechanism 25 at a center thereof. The core member 22 is located in a hollow space defined by the tube producing die 21. The holding mechanism 25 and the tube producing die 21 held thereby are slidably movable relative to the core member 22.

FIG. 5 illustrates the transmission mechanism 31. The transmission mechanism 31, which is a speed reduction mechanism, comprises a Hindley worm 33 having a helical groove 32 and a worm wheel 35 which engages with the worm 33. As noted above, the shaft (input shaft) 50 of the Hindley worm 33 is connected to the shaft of the motor 2 of FIG. 1. The output shaft 51 of the wheel 35 is connected with the eccentric shaft 52 of FIG. 1. The wheel 35 includes a circular plate and a plurality of recesses 34 of rectangular cross section of the outer peripheral surface of the circular plate, the recesses 34 evenly disposed and spaced angularly apart one from the other at a pitch equal to that of the groove 32 of the worm 33.

Figure 9:
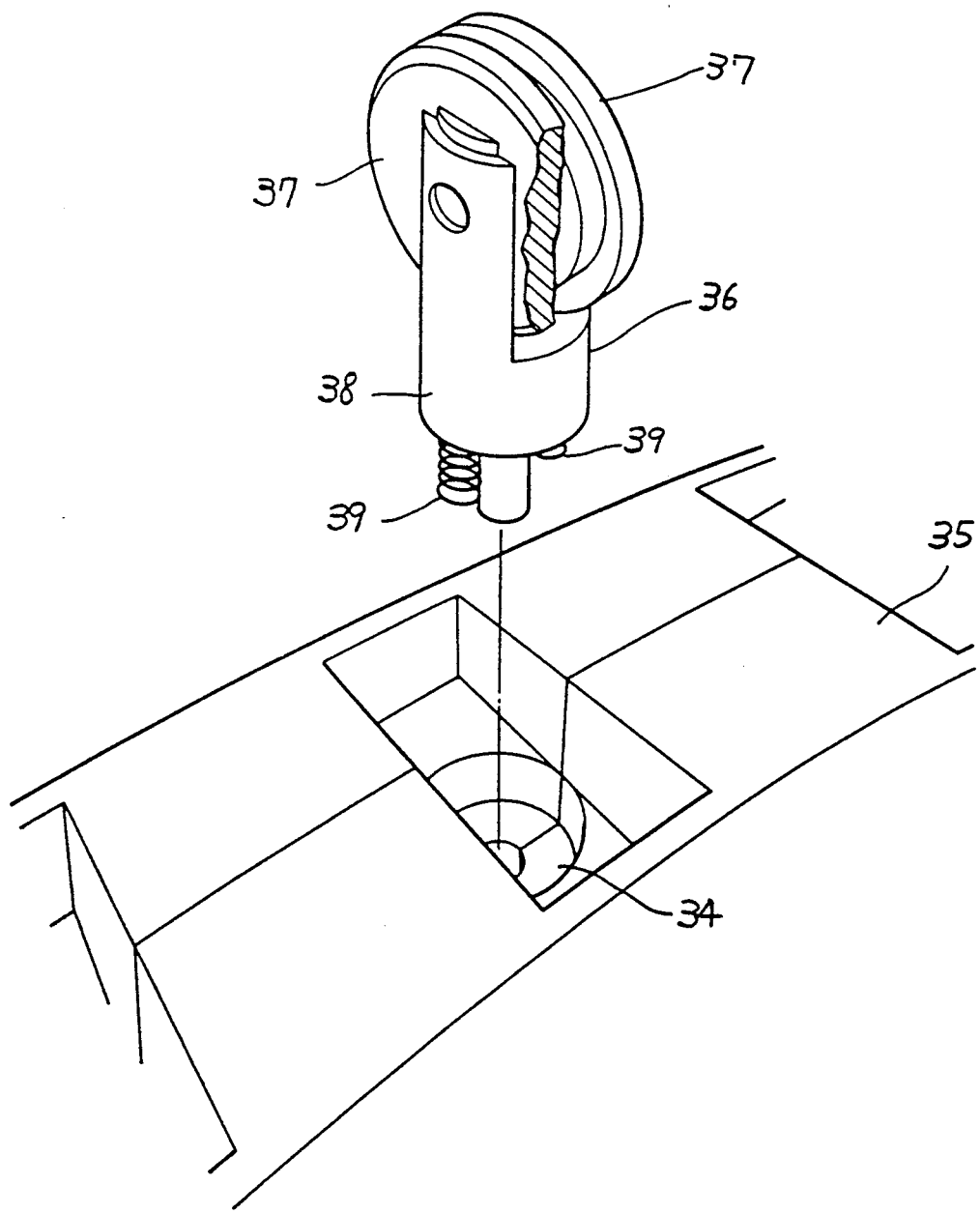
FIG. 9 is a perspective view of the worm gear mechanism illustrated in FIG. 5.

As best shown in FIG. 9, each recess 34 has a hollow portion 34' extending inward from the bottom thereof, and an aperture 34" of a smaller cross section than the hollow extending inward from the bottom of the hollow. At the recesses 34, a plurality of roller units (which, in fact, are teeth mechanisms 36 of the worm wheel 35) are respectively mounted, each of which has a roller-support 38 which is adapted to be received in the hollow portion 34' of the recess 34, and a pair of concentric rollers 37 of a circular cross section, rotatably supported by the roller-support 38 in such a manner that the common axis of the rollers 37 is generally perpendicular to the axis of the wheel 35. The roller-support 38 further has a rod portion 38' extending concentrically from the bottom of the roller-support 38 to be inserted into the aperture 34" of the recess 34. A pair of springs 39 are interposed between the bottom of the roller-support 38 and the bottom of the hollow of the recess 34 to push the roller-support 38 outwardly. As described above, the pairs of the rollers 37 which project radially outward from the outer peripheral surface of the circular plate, are able to be radially extended and retracted, and the rollers are maintained against the worm 33 by the springs 39. Furthermore, the rollers 37 can rotate along the groove 32 of the worm 33 with little friction between the groove 32 and the roller 37. Therefore, as the worm 33 rotates, the wheel 35 can rotate without any backlash between the groove 32 and the roller 37, so that the wheel 35 can rotate very smoothly. Furthermore, between the above mentioned elements, there are suitable clearances, so that the roller 37 can be inclined slightly in response to the warp of the face of the groove 32. Since the wheel 35 rotates smoothly, the produced pipe has smooth seamless outer and inner surfaces.

Numeral 12 denotes a bearing mechanism which is preferably provided at the points wherein sliding contact of the elements occurs.

In the above embodiment, the tube producing die 21 moves relative to the core member 22 by means of the movable bed 23. But, as is clear by the above explanation, the core member 22 may be displaced relative to the tube producing die 21 as the position of the core member 22 relative to the tube producing die 21 or vice versa is important while producing a curvilinear tube. Further, the link mechanism may be replaced by any kind of link mechanisms as far as the mechanism enables a fine motion control of the movable bed 23 according to a rotational movement of the worm wheel mechanism 35.

By virtue of the above mentioned construction, fine positioning of the bending die relative to the core member has become possible. More specifically the fine positioning has become possible by virtue of the worm gear wherein backlashes are eliminated and the link and crank mechanism which reduces the intensity of movement while it transforms a rotational movement of the electric motors 2 to linear movements of the movable bed 23. Further, the control unit for controlling a movement of the movable bed 23 makes the positioning of the movable bed easier and more precise.

The apparatus produces a curvilinear tube from a paste-like material such as a thermoplastic resin. The material is heated prior to its introduction into the apparatus so as to increase the plasticity. With specific reference to FIG. 8, numeral 53 indicates a material passageway comprising a material intake 54 which communicates with an outlet portion 30, a gap 30 between the tube producing die 21 and the core member 22. The tube raw material 55 flows into the material intake 54 to the material passageway 53. The material is sent forward to the gap 30 between the tube producing die 21 and the core member 21 by means of a screw-type conveyor 56. The screw-type conveyor 56 is driven by a motor 57 through a pulley 58, a belt 59, and a pulley 60. While the material passes through the gap 30 between the tube producing die 21 and the core member 22, the gap 30 is adjusted by the movement of the tube producing die 21 secured to the movable die 23. At the same time, the material hardens. Therefore, a curvilinear tube 61 can be extruded from the outlet portion While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for producing curvilinear tubes, the apparatus comprising:
   (a) a die having an axially symmetric inner surface for passing tube material therethrough;
   (b) a core member having an axially symmetrical outer surface and disposed in the die in a spaced relation to the inner surface of the die so that tube producing material passes between a gap defined by the inner surface of the die and the outer surface of the core member; and
   (c) positioning means for positioning the die in offset relation to the core member in a plane perpendicular to an axis of the core member wherein the positioning means comprises motor means for displacing the die relative to the core member, and transformation means for transforming a rotational movement of an output shaft of said motor means to a linear movement of the die,
   said transformation means including a speed reducing transmission mechanism connected to the output shaft, said transmission mechanism including a worm and a worm wheel, said worm having a generally cylindrical form tapered from both ends thereof to a central portion thereof, said worm wheel having a plurality of teeth, each of the teeth comprising a disk rotatably supported on said worm wheel and biased toward the worm by resilient means so as to eliminate backlash between said worm and said worm wheel.

2. An apparatus for producing curvilinear tubes according to claim 1, wherein the positioning means is capable of displacing the die relative to the core member as the tube material is passing through the die.

3. An apparatus for producing curvilinear tubes according to claim 1, wherein the positioning means comprises a pair of electric motors and transformation means for converting rotational movement of the electric motors to a bi-axial movement of the die.

4. An apparatus for producing curvilinear tubes according to claim 1, wherein the transformation means comprises a crank, one end of which is operatively attached to an output shaft of said transmission mechanism, and the other end of which is attached to a link mechanism extending between the crank and a movable bed carrying said die to thereby transform the rotational movement of said motor output shaft to linear movement of said die.

5. An apparatus for producing bent tubes according to claim 1 which further comprises a drive means for driving the tube material through the gap between the core member and the die.

6. An apparatus for producing bent tubes according to claim 1 which further comprises a control means for controlling the positioning means.

7. Apparatus for producing curvilinear tubes comprising:

(a) an annular, open ended die having a longitudinal center axis;
(b) a core member having a longitudinal center axis disposed within the annular die;
(c) positioning means for moving the annular die relative to the core member so that the respective longitudinal axes of said die and said core member are offset; wherein said annular die is mounted on a movable bed and said positioning means includes a pair of motors for moving said bed in two dimensions;

and transformation means for transforming a rotational movement of an output shaft of each motor to a linear movement of the die, said transformation means including a worm mounted on a shaft and a worm wheel for reducing the speed of said output shaft, said worm having a generally cylindrical form tapered from both ends thereof to a central portion thereof, said worm wheel having a plurality of teeth, each of the teeth comprising a disk rotatably supported on said worm wheel and biased toward the worm and said worm wheel.

8. Apparatus according to claim 7 and further including means for forcing tube material through a gap defined by said annular die and said core member.

9. Apparatus according to claim 7 wherein said positioning means comprises first and second positioning mechanisms for moving the die in each of two substantially perpendicular directions.

10. Apparatus according to claim 9 wherein one each of said pair of motors is associated with each of said first and second positioning mechanisms, the output shaft of each motor is connected to said worm shaft, and said worm wheel is fixed to a transmission output shaft; and wherein means are provided for transforming rotation motion of said transmission output shaft to linear movement of said die.

11. Apparatus according to claim 7 including a fixing bed mounted on a frame, said core member being fixed by said fixing bed; and wherein said movable bed is supported on said fixing bed.

* * * * *